US012735578B2

(12) United States Patent
Liu et al.

(10) Patent No.: US 12,735,578 B2

(45) Date of Patent: Sep. 15, 2026

(54) ICE-SHEDDING AND SMUDGE-REPELLANT COATING

(71) Applicant: Queen's University at Kingston, Kingston (CA)

(72) Inventors: Guojun Liu, Kingston (CA); Alexander Newell Harper, Toronto (CA)

(73) Assignee: Queen's University at Kingston, Kingston (CA)

( * ) Notice: Subject to any disclaimer, the term of this patent is extended or adjusted under 35 U.S.C. 154(b) by 959 days.

(21) Appl. No.: 17/798,647

(22) PCT Filed: Feb. 12, 2021

(86) PCT No.: PCT/CA2021/050149

§ 371 (c)(1),
(2) Date: Aug. 10, 2022

(87) PCT Pub. No.: WO2021/159208

PCT Pub. Date: Aug. 19, 2021

(65) Prior Publication Data

US 2023/0056474 A1 Feb. 23, 2023

Related U.S. Application Data

(60) Provisional application No. 62/976,622, filed on Feb. 14, 2020.

(51) Int. Cl.

| | |
|---|---|
| ***C09D 5/00*** | (2006.01) |
| ***C08G 18/62*** | (2006.01) |
| ***C08G 18/63*** | (2006.01) |
| ***C08G 18/73*** | (2006.01) |
| ***C09D 7/20*** | (2018.01) |
| ***C09D 175/04*** | (2006.01) |

(52) U.S. Cl.

CPC .......... *C09D 5/00* (2013.01); *C08G 18/6229* (2013.01); *C08G 18/638* (2013.01); *C08G 18/73* (2013.01); *C09D 7/20* (2018.01); *C09D 175/04* (2013.01)

(58) Field of Classification Search

CPC .......... C09D 5/00; C09D 7/20; C09D 175/04; C08G 18/6229; C08G 18/638; C08G 18/73

USPC .......... 524/588

See application file for complete search history.

(56) References Cited

FOREIGN PATENT DOCUMENTS

| | | | |
|---|---|---|---|
| CA | 2987433 | A1 | 11/2016 |
| CN | 110607127 | A | 12/2019 |

(Continued)

OTHER PUBLICATIONS

Hu et al. J. Mater. Chem. A, Jul. 2019, 1519-1528. (Year: 2019).*

(Continued)

*Primary Examiner* — Robert S Jones, Jr.
*Assistant Examiner* — Elizabeth Amato
(74) *Attorney, Agent, or Firm* — Angela Lyon

(57) ABSTRACT

A coating that is able to shed accumulated material (such as ice) that includes a crosslinkable copolymer with hydrogen bonding moieties and liquid-like side chains, and an oil (or other non-aqueous liquid) that is compatible with the side-chains and that resides in the crosslinked coating and on the surface of the coating together with the side-chains that are on the external surface. Methods may use the coating for de-icing, shedding of marine organisms, and smudge-repellency.

16 Claims, 5 Drawing Sheets

(56) References Cited

FOREIGN PATENT DOCUMENTS

| | | | | |
|---|---|---|---|---|
| JP | 2006-131547 | A | 5/2006 | |
| WO | WO-2016176350 | A1 * | 11/2016 | ........... C09D 175/04 |
| WO | WO2019/006559 | A1 | 1/2019 | |

OTHER PUBLICATIONS

Hu, J. Mater. Chem. A, Jul. 2019, 1519-1528 (Year: 2019).*

International Search Report and Written Opinion of corresponding International Application No. PCT/CA2021/050149 filed on Feb. 12, 2021.

Huang, S. et al., "Water-based anti-smudge NP-GLIDE polyurethane coatings", Chemical Engineering Journal, vol. 351, pp. 210-220, (2018).

Hu, H. et al., "Preparation and comparison of NP-GLIDE, SLIPS, superhydrophobic, and other coatings from identical precursors at different mixing ratios". Journal of Materials Chemistry A, vol. 7, pp. 1519-1528, (2019).

* cited by examiner

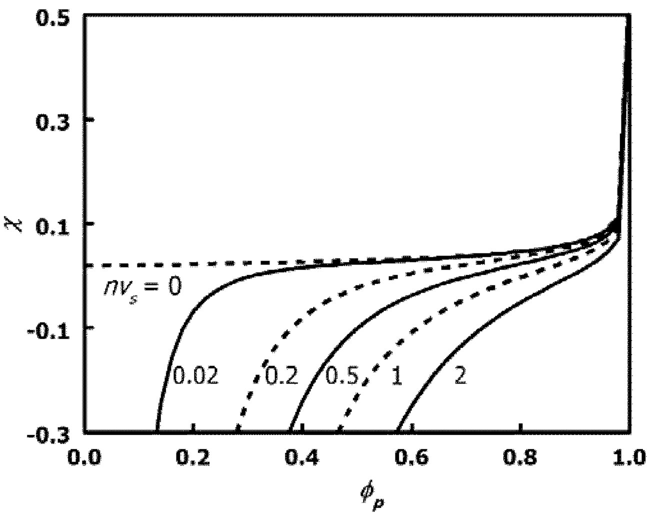
Fig. 1
Fig. 2A
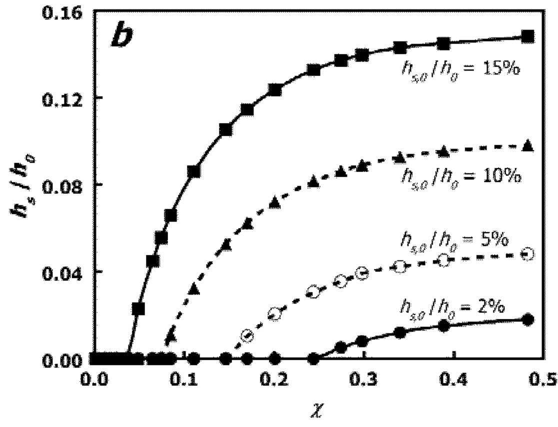
Fig. 2B

ICE-SHEDDING AND SMUDGE-REPELLANT COATING

RELATED APPLICATIONS

This application is a 371 of International Application No. PCT/CA2021/050149 filed on Feb. 12, 2021, and claims the benefit of the filing date of U.S. Application No. 62/976,622 filed on Feb. 14, 2020, the contents of which are incorporated herein by reference in their entirety.

FIELD

The invention relates to coatings. In particular, coatings that are able to shed a material when the material accumulates on them.

BACKGROUND

The accumulation of ice on wings and other critical aviation parts of aircraft has caused fatal accidents in the past. The accretion of ice due to freezing rain on transmission towers and power lines has triggered expensive infrastructure damage and wide-scale power outages.

Accumulation of marine organisms on ships is also a costly problem. Ships must be drydocked for scraping to remove the buildup of organisms, and repainting. There is a need for a coating that sheds accumulated material such as ice and marine organisms.

SUMMARY

Ice that exceeds a certain thickness may fall spontaneously under its own weight from an ice-shedding coating according to embodiments described herein. Such coatings are highly useful because buildups of ice on equipment, facilities, and buildings may have devastating effects. Embodiments may also prevent the accumulation of marine organisms on ships, and/or facilitate the shedding of marine organisms from ships, thereby avoiding costly drydocking for scraping to remove the buildup of organisms, and repainting.

In one embodiment, a method for shedding accumulated material is provided, that includes applying a coating precursor to a substrate to form a crosslinked coating, wherein the coating precursor comprises a crosslinkable copolymer comprising hydrogen bonding moieties and liquid-like side chains that are compatible (miscible) with a selected non-aqueous liquid, adding 0.2-30 vol % or 2-30 vol % of the selected non-aqueous liquid either to the coating precursor or to the crosslinked coating, wherein accumulated material on the coating readily sheds.

In one embodiment, a method for shedding accumulated material is provided, that includes applying a coating precursor to a substrate to form a crosslinked coating, wherein the coating precursor comprises a crosslinkable graft copolymer comprising hydrogen bonding moieties and liquid-like side chains that are compatible (miscible) with a selected non-aqueous liquid, adding 0.2-30 vol % or 2-30 vol % of the selected non-aqueous liquid either to the coating precursor or to the crosslinked coating, wherein accumulated material on the coating readily sheds.

In one embodiment, a coating that sheds accumulated material is provided, that includes a coating precursor that comprises a crosslinkable copolymer comprising hydrogen bonding moieties and liquid-like side chains that are compatible with a selected non-aqueous liquid, 0.2-30 vol % or 2-30 vol % of the selected non-aqueous liquid, wherein when the coating is crosslinked, at least a portion of the liquid-like side-chains and the non-aqueous liquid are present at the surface of the coating.

In one embodiment, a coating that sheds accumulated material is provided, that includes a coating precursor that comprises a crosslinkable graft copolymer comprising hydrogen bonding moieties and liquid-like side chains that are compatible with a selected non-aqueous liquid, 0.2-30 vol % or 2-30 vol % of the selected non-aqueous liquid, wherein when the coating is crosslinked, at least a portion of the liquid-like side-chains and the non-aqueous liquid are present at the surface of the coating.

In one embodiment of the method or coating, the copolymer comprises polyurethane, epoxy, polymethacrylate, polymer/inorganic hybrid coating, rubber, or polyacrylate. In one embodiment of the method or coating, the hydrogen bonding moieties include acrylamide, urea, urethane, ureidopyridinone, hydroxyl, carboxyl, amino, pyridine, nucleic bases, or any combination thereof. In one embodiment of the method or coating, the non-aqueous liquid is ethylene glycol, ionic liquid, glycerol, oligo(ethylene glycol), or oil. In one embodiment of the method or coating, the oil is cooking oil, canola oil, vegetable oil, PDMS, or perfluorinated polyether, poly(alkyl acrylates), polyisobutylene, or any polymer that is a liquid down to −40° C. In one embodiment of the method or coating, the oil comprises poly(dialkyl siloxane), poly(dimethyl siloxane) (PDMS, silicone oil), poly(diphenyl siloxane), poly(methylphenyl siloxane), polyisobutylene, poly(alkyl methacrylate), poly(alkyl acrylate), poly(alkyl styrene), perfluorinated polyether, poly(diethyl siloxane), hexadecane, sunflower oil, canola oil, cotton seed oil, or a combination thereof. In one embodiment of the method or coating, the oil is a low-surface-tension oil. In one embodiment of the method or coating, the liquid-like side chains and the non-aqueous liquid are the same. In one embodiment of the method or coating, the liquid-like side chains and the non-aqueous liquid are different. In one embodiment of the method or coating, the accumulated material comprises ice, marine organisms, bacteria, blood, biofluids, proteins, smudges, and/or stains. In one embodiment of the method or coating, the smudges comprise fingerprints, ink, paint, contaminated oil, blood, coffee, muddy water, or any combination thereof. In one embodiment of the method or coating, the non-aqueous liquid is ethylene glycol and the liquid-like side chains are poly (ethylene glycol). In one embodiment of the method or coating, the non-aqueous liquid is PDMS and the liquid-like side chains are PDMS. In one embodiment of the method or coating, the precursor further comprising a crosslinker. In one embodiment of the method or coating, the crosslinker is polyisocyanate. In one embodiment of the method or coating, the precursor further includes a catalyst. In one embodiment of the method or coating, the catalyst comprises dibutyltin dilaurate or a tertiary amine. In one embodiment of the method or coating, the crosslinked coating has covalent bonds and hydrogen bonds, wherein the number of hydrogen bonds increases as non-aqueous liquid moves from an interior location to an exterior location on the crosslinked coating. In one embodiment of the method or coating, the non-aqueous liquid moves from the interior to the exterior of the crosslinked coating until interior reserves are substantially depleted. In one embodiment of the method or coating, interior reserves of non-aqueous liquid can be replenished by applying one or more coats of non-aqueous liquid to the crosslinked polymer.

In one embodiment, a kit is provided for applying a coating that sheds accumulated material, that includes polyol in a first container, polyisocyanate in a second container, and a catalyst in the first or second container. In one embodiment, the kit includes a selected non-aqueous liquid.

One aspect of the invention provides a method for shedding accumulated material, that includes a coating that comprises P(EHMA-s-HEMA), P(EHMA-s-HEMA)-g-PDMS, P(EHMA-s-HEMA)-based polyurethane, P(EHMA-s-HEMA)-g-PDMS-based polyurethane, P(EHMA-s-MMA-s-HEMA), P(EHMA-s-MMA-s-HEMA)-based polyurethane, P(EHMA-s-MMA-s-HEMA)-g-PDMS, P(EHMA-s-MMA-s-HEMA)-g-PDMS-based polyurethane, or any combination thereof, wherein EHMA is 2-ethylhexyl methacrylate; HEMA is 2-hydroxyethyl methacrylate; and PDMS is poly(dimethyl siloxane).

In one embodiment, the coating precursor comprises a lubricated bilayer coating. In one embodiment, the coating comprises a copolymer that comprises a first and a second polyol, wherein the second polyol comprises a small fraction of fluorinated moieties and comprises a lower molar fraction of hydroxyl groups than the first polyol. In one embodiment, the first polyol is P(EHMA$_{80\%}$-s-HEMA$_{20\%}$) and the second polyol is P(EHMA$_{93\%}$-s-HEMA$_{3\%}$-s-FHEMA$_{4\%}$), where EHMA denotes EHMA is 2-ethylhexyl methacrylate; HEMA denotes 2-hydroxyethyl methacrylate; FHEMA denotes 2-(perfluorohexyl) ethyl methacrylate), and subscripts denote molar fractions of monomers in the copolymer. In one embodiment, the coating comprises P(EHMA-s-HEMA), P(EHMA-s-HEMA)-g-PDMS, P(EHMA-s-HEMA)-based polyurethane, P(EHMA-s-HEMA)-g-PDMS-based polyurethane, P(EHMA-s-MMA-s-HEMA), P(EHMA-s-MMA-s-HEMA)-based polyurethane, P(EHMA-s-MMA-s-HEMA)-g-PDMS, P(EHMA-s-MMA-s-HEMA)-g-PDMS-based polyurethane, or any combination thereof, wherein EHMA is 2-ethylhexyl methacrylate; HEMA is 2-hydroxyethyl methacrylate; and PDMS is poly (dimethyl siloxane). In one embodiment, the coating comprises a lubricated bilayer coating. In one embodiment, the coating comprises a copolymer that comprises a first and a second polyol, wherein the second polyol comprises a small fraction of fluorinated moieties and comprises a lower molar fraction of hydroxyl groups than the first polyol. In one embodiment, the first polyol is P(EHMA$_{80\%}$-s-HEMA$_{20\%}$) and the second polyol is P(EHMA$_{93\%}$-s-HEMA$_{3\%}$-s-FHEMA$_{4\%}$), where EHMA denotes EHMA is 2-ethylhexyl methacrylate; HEMA denotes 2-hydroxyethyl methacrylate; FHEMA denotes 2-(perfluorohexyl) ethyl methacrylate), and subscripts denote molar fractions of monomers in the copolymer. In one embodiment, the coating comprises P(EHMA-s-HEMA)-g-PDMS, wherein EHMA is 2-ethylhexyl methacrylate; HEMA is 2-hydroxyethyl methacrylate; and PDMS is poly(dimethyl siloxane). In one embodiment, the lubricant is PDMS-UPy, wherein PDMS is poly(dimethyl siloxane); and UPy is ureidopyrimidinone.

One aspect of the invention provides a coating comprising a mixture of HDIT and UPy-NCO referred to as PU-H0, PU-H50, PU-H75, and PU-H100 wherein 0, 50, 75, and 100 are an amount on the percentile scale of isocyanate groups contributed by UPy-NCO.

In one embodiment, the crosslinked coating comprises P(EHMA-s-HEMA)-g-PDMS. In one embodiment, the selected non-aqueous liquid is silicone oil. In one embodiment, the coating comprises a mixture of HDIT and UPy-NCO referred to as PU-H0, PU-H50, PU-H75, and PU-H100 wherein 0, 50, 75, and 100 are an amount on the percentile scale of isocyanate groups contributed by UPy-NCO.

One aspect of the invention provides P(EHMA-s-HEMA)-g-PDMS.

One aspect of the invention provides a kit for applying the coating, comprising a first container that comprises polyol, a second container that comprises polyisocyanate, a catalyst that is present in the first or second container, and optionally further comprising a selected non-aqueous liquid. In one embodiment, the kit includes polyol P(EHMA-s-HEMA), P(EHMA-s-HEMA)-g-PDMS.

In one embodiment of the coating, the crosslinkable copolymer is a graft copolymer. In one embodiment of the coating, the crosslinkable copolymer is a mixture of at least two polymers. In one embodiment of the method, the crosslinkable copolymer is a graft copolymer. In one embodiment of the method, the crosslinkable copolymer is a mixture of at least two polymers.

BRIEF DESCRIPTION OF THE DRAWINGS

For a better understanding of the invention and to show more clearly how it may be carried into effect, reference will now be made, by way of example, to the accompanying drawings, wherein:

FIG. 1 shows a plot of binodal curves generated for coatings with $nv_s$ values of 0, 0.0200, 0.200, 0.50, 1.00, and 2.00, respectively.

FIG. 2A shows a plot of $h_s/h_0$ vs $\chi$ generated for a system in which $nv_s$=2.00 and $x_s$=27.

FIG. 2B shows a plot of $h_s/h_0$ vs $\chi$ generated for a system in which $nv_s$=0.74 and $x_s$=10.

DETAILED DESCRIPTION OF EMBODIMENTS

Definitions

Figure 3A:
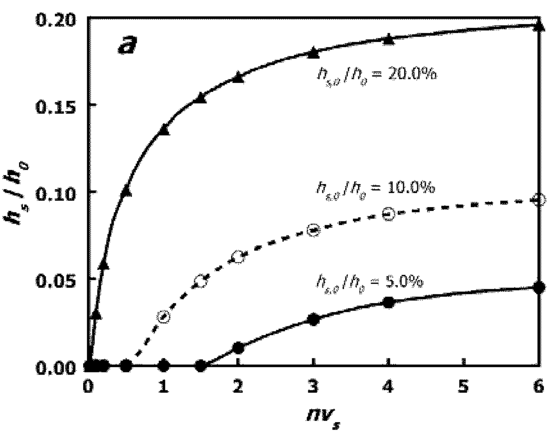
FIG. 3A shows a plot showing the effect of varying $nv_s$ on $h_s/h_0$ at various lubricant feed contents $h_{s,0}/h_0$ and the $\chi$ parameters of 0.0456.

As used herein, the term “A” refers to the lateral surface area of the coating.

As used herein, the term “f” refers to force required to detach something (e.g., ice).

As used herein, the term “$h_p$” refers to the thickness of the lubricant-containing polymer film.

As used herein, the term “$h_s$” refers to thickness of the surface lubricant layer, which is at equilibrium with the polymer film.

As used herein, the term “$h_0$” refers to a constant that represents the sum for the thicknesses of the dry polymer film and the lubricant layer.

As used herein, the terms "$h_s$" and "$h_p$" become $h_{s,0}$ and $h_{p,0}$, respectively, when the lubricant is fully segregated from the polymer film.

As used herein, the term "$h_{s,0}/h_0$" refers to the ratio between the thickness of the added oil film before its absorption by the polymer layer and the total thickness of the oil and polymer layers. This ratio is equal to the volume fraction of the lubricating oil in the system consisting of the polymer film and oil.

As used herein, the term "$h_s/h_0$" refers to the ratio between the thickness of the oil film above the oil-swollen polymer film after polymer swelling equilibrium has been established and the total thickness of the oil and polymer layers.

As used herein, the term "$n_S$" refers to the number of lubricant molecules in the polymer layer.

As used herein, the term "$v_e$" refers to the number of crosslinks in the polymer layer.

As used herein, the term "$x_s$" refers to the number of repeat units of the lubricant.

As used herein, the term "$\chi$" refers to a Flory-Huggins interaction parameter regarding interaction of the polymer and the oil film.

As used herein, the term "$V_0$" refers to volume of dry polymer.

As used herein, the term "$v_e/V_0$" refers to polymer crosslinking density.

As used herein, the term "n" refers to polymer crosslinking density.

As used herein, the term "$v_s$" refers to molecular volume of the lubricant.

As used herein, the term "$Ø_p$" refers to polymer volume fraction in the swollen layer.

As used herein, the term "$\Gamma$" refers to ice/coating interfacial toughness (energy required to detach a unit ice/coating interfacial area). As used herein, the term "$\tau$" refers to ice adhesion strength (i.e., adhesion force per unit ice/coating interfacial area). For ice removal from a soft coating, both $\tau$ and $\Gamma$ are proportional to shear modulus of the coating.

As used herein, the term "S" refers to ice/coating interfacial area.

As used herein, the term "$n_s$" refers to the number of lubricant molecules in the polymer layer.

As used herein, the term "$v_e$" is the number of crosslinks (crosslinking junctions) in the polymer.

As used herein, the term "EHMA" refers to 2-ethylhexyl methacrylate.

As used herein, the term "HEMA" refers to 2-hydroxyethyl methacrylate.

As used herein, the term "PDMS" refers to poly(dimethyl siloxane), which is also known as silicone oil.

As used herein, the term "MA" refers to methacrylate

As used herein, the term "UPy-NCO" refers to ureidopyrimidinone bearing a reactive isocyanate group,

EMBODIMENTS

Ice sheds via its detachment from a coating through two mechanisms. When ice/coating interfacial area A is small, all of the ice's binding sites may detach simultaneously from a coating and the ice moves with the shedding force. The force required to detach the ice in this case is given by $$f=\tau S \tag{1}$$

where S is the ice/coating interfacial area and $\tau$ denotes the ice adhesion strength (i.e., adhesion force per unit ice/coating interfacial area). Thus, $\tau$ offers a measure for the ease of ice removal. When a large sheet of ice is pushed, not all of its binding sites detach from a coating simultaneously. Rather, the ice initially detaches locally near the applied force via the formation of a crack. The crack then grows under a constant shearing force and propagates eventually to the entire ice/coating interface. In this regime, the interfacial toughness $\Gamma$ rather than $\tau$ is the measure for the likelihood of ice removal. Since both $\tau$ and $\Gamma$ are proportional to the shear modulus of a coating from which ice is removed, the removal of ice from a low-shear-modulus oil film is much more facile than from a solid surface.

To enable shedding of an accumulated material (e.g., ice, smudges, marine organisms), a thin film of lubricant oil is present on an underlying rigid layer. While the film renders the desired repellency, the sublayer bestows mechanical strength and serves as a reservoir for the lubricant. Ice-shedding oil films have been produced in one approach by over-filling a rigid porous surface with a lubricating oil, yielding a slippery liquid infused porous surface (SLIPS) (Kim, P., et al., *ACS Nano* 2012, 6(8), 6569-6577). In one embodiment, the coatings include an NP-GLIDE coating as described in International Patent Application Publication Nos. WO/2019/006559 and WO 2016/058104, both of which are hereby incorporated by reference.

Figure 5A:
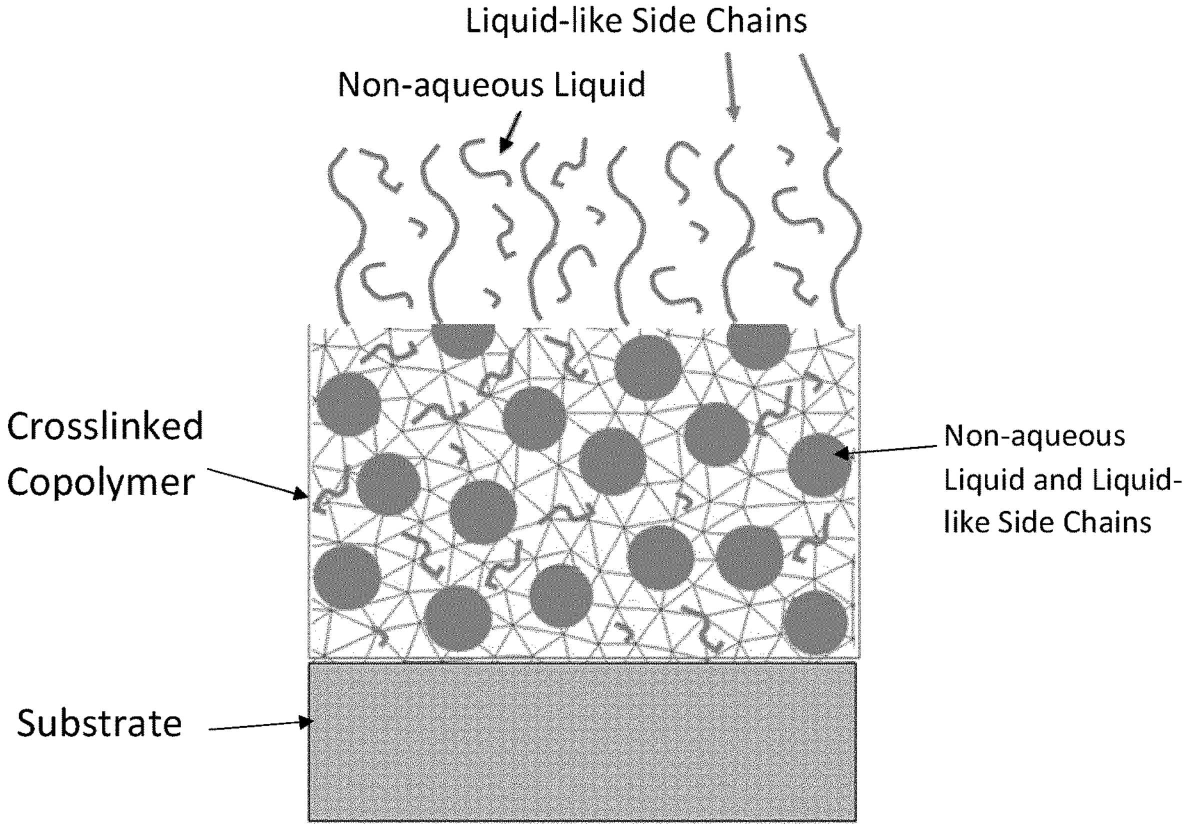
FIG. 5A shows a schematic of a coated substrate as described herein.
Figure 5B:
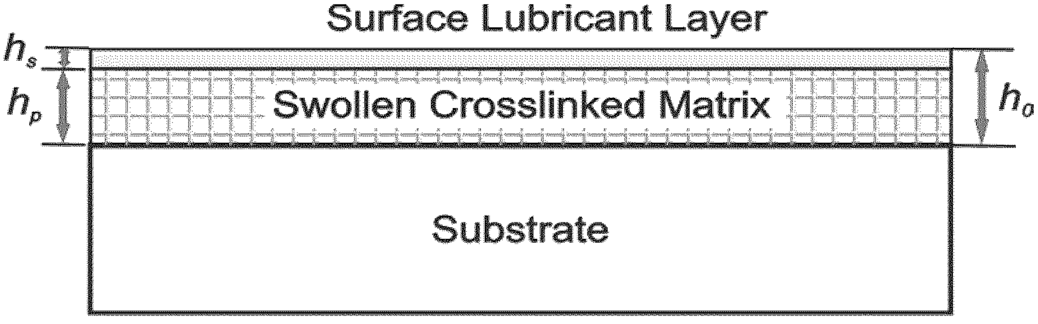
FIG. 5B shows a schematic of the coated substrate with $h_0$, $h_s$ and $h_p$ shown.

As described in the examples and figures herein, a coating is described that enables shedding of accumulated material (see schematics in FIGS. 5A and 5B). Such accumulated material may include ice, marine organisms, mud, bacteria, ink, paint, contaminated oil, blood, coffee, muddy water, blood, biofluids, proteins, smudges (e.g. fingerprints), stains, or any combination thereof. For example, such a coating would enable continuous de-icing when it is present on airplanes. The coatings that shed accumulated material have the following parts:

- a base coating of crosslinked graft copolymer that is capable of absorbing a non-aqueous liquid and that has liquid-like side-chains and hydrogen bonding moieties; and
- a non-aqueous liquid that is interspersed inside the graft copolymer base coating and on the exterior of the graft copolymer base coating and is assisted to stay in place by the liquid-like side-chains of the graft copolymer.

If reserves of non-aqueous liquid inside the crosslinked base coating are low, they can be replenished by applying one or more coats of non-aqueous liquid to the crosslinked graft copolymer. For example, several coats could be applied with time in between coats for absorption to occur. Once the coating has absorbed all the non-aqueous liquid that it can, one should be able to feel the surface and notice that the surface feels like the non-aqueous liquid is present (i.e., an oily feeling).

In one embodiment, the liquid-like side-chains are compatible (i.e., miscible with) with the selected non-aqueous liquid. In one embodiment, the side-chains and the non-aqueous liquid are the same. In one embodiment, the side-chains and the non-aqueous liquid are different.

The side chains are substantially linear moieties that are bound at one end to the graft copolymer. The side chains are polymer moieties that are liquid at temperatures above −40° C.

In one embodiment, a method of shedding accumulated material is provided that includes

- applying a coating precursor to a substrate to form a crosslinked coating, wherein the coating precursor includes a crosslinkable graft copolymer comprising hydrogen bonding moieties and liquid-like side chains that are compatible with a selected non-aqueous liquid, adding 2-30 vol % of the selected non-aqueous liquid either to the coating precursor or to the crosslinked coating to form a coating that sheds, wherein accumulated material on the coating readily sheds.

In one embodiment, a graft copolymer is prepared in-situ. Instead of pre-making the graft copolymer, one can start with a macromer (e.g., PDMS-MA, which is PDMS bearing a terminal methacrylate unit). The macromer can be photopolymerized with other monomers and the nonaqueous liquid to produce a coating.

In one embodiment, a kit for a coating that sheds accumulated material is provided. The kit includes a coating precursor capable of forming a crosslinked coating, wherein the coating precursor comprises a crosslinkable graft copolymer comprising hydrogen bonding moieties and liquid-like side chains that are compatible with a selected non-aqueous liquid.

In one embodiment, the kit further comprises a selected non-aqueous liquid.

In one embodiment, a kit is provided to apply a coating that sheds accumulated material. The kit includes a first container that comprises polyol, a second container that comprises polyisocyanate, and a catalyst that is present in the first or second container. In one embodiment, the kit includes a selected non-aqueous liquid. In some embodiments, the kit also includes written instructions or directions to a website that provides instructions. Non-limiting examples of the non-aqueous liquid include ethylene glycol, glycerol, oligo(ethylene glycol), ionic liquid, or oil. Examples of oils include cooking oil, canola oil, vegetable oil, PDMS, perfluorinated polyether, poly(alkyl acrylates), or polyisobutylene. Oils may include poly(dialkyl siloxane), poly(dimethyl siloxane) (PDMS, silicone oil), poly(diphenyl siloxane), poly(methylphenyl siloxane), polyisobutylene, poly(alkyl methacrylate), poly(alkyl acrylate), poly(alkyl styrene), perfluorinated polyether, poly(diethyl siloxane), hexadecane, sunflower oil, canola oil, cotton seed oil, or a combination thereof.

Embodiments provide a coating that includes a thin non-aqueous liquid layer that is in equilibrium with reserves of non-aqueous liquid that are located within the crosslinked graft copolymer coating. The length of the graft side-chains is relevant to the thickness of the layer of non-aqueous liquid that resides on the exterior surface of the coated substrate. The side-chains assist with holding the non-aqueous liquid in place on the coated substrate's surface. In one embodiment, the thickness of non-aqueous liquid is about 100 nm.

The coatings that shed include grafted side chains. In one embodiment, the side chains are hydrocarbon or polydimethylsiloxane (silicone oil) moieties, or a combination thereof, that are covalently attached at one end of the moiety with the opposite end free and unbound. Such coatings are ideal for ice shedding and smudge repellency. In one embodiment, the side chains are bound by both ends to the copolymer. In this case, the side chains that are present at the surface form loops on the surface. While the non-aqueous liquid renders the desired repellency, the crosslinked polymer layer bestows mechanical strength and serves as a reservoir for the lubricant.

The non-aqueous liquid can be, for example, a fluorinated compound that is an oil that is incompatible with water. Examples include a polymer film that has covalently attached side groups, which are bound at one or both ends of the side groups (e.g., hydrocarbon or polydimethylsiloxane (silicone oil) moieties). Examples include a covalently grafted silicone oil that is swollen with free silicone oil.

One embodiment includes a "smart" coating matrix that tunes factors so that non-aqueous liquid is released only during winter. Such temperature-dependent release enables ice shedding properties in cold temperatures while in warm temperatures, it enables storage of non-aqueous liquid in the crosslinked polymer matrix, thus minimizing loss. Additionally, the matrices serve as adaptive reservoirs, replenishing non-aqueous liquid after loss from, for example, an ice shedding event, until the reserve is substantially exhausted.

In this study, crosslinked graft copolymer substrate-bound polymer is considered as a rubber film that is assumed to only expand or contract along a vertical direction. The Flory-Rehner theory for treating 1-D swelling of rubber by a solvent was used to derive the system's free energy, which was further used to construct phase diagrams of such systems. From the phase diagrams and the known feed volume ratios between lubricant and polymer, $h_s$ was calculated and plotted as a function of the Flory-Huggins parameter for the polymer and the lubricant, the crosslinking density of the polymer, the molecular volume, and the amount of lubricant. Aside from using these plots for regulating $h_s$ and for justifying prior experimental observations, methods were proposed to tune different variables to sustain release of lubricant until it is exhausted. Thermo-responsive coatings are described that store lubricant in the polymer matrix at warm temperatures and release lubricant at cold temperatures to enable ice shedding.

In this study, the thickness of the lubricant layer in equilibrium with an underlying polymer layer is of focus because of two considerations. First, the ice/coating interfacial toughness Γ is proportional to the thickness of the oil film and regulating the thickness of the oil film facilitates ice shedding in the Γ-dominated regime. Second, a thin lubricant film minimizes the loss of lubricant from each ice-shedding event. Intuitively, one envisions that ice may grow into the oil layer. On a thicker lubricant layer, the formed ice may entrap more oil. When ice falls, more lubricant should fall with it and get lost.

One embodiment provides a thin film of a low-surface-tension oil (examples include PDMS, perfluorinated polyether, poly(diphenyl siloxane), poly(diethyl siloxane), hexadecane, sunflower oil, canola oil, cotton seed oil,) which is highly effective for shedding marine organisms. Such shedding may occur underwater. One in air embodiment is a coating that enables repelling of stains or smudges. Examples of smudges include fingerprints, ink, paint, contaminated oil, blood, coffee, muddy water, etc.

The parameter of interest is the thickness $h_s$ of a lubricant layer that is in equilibrium with an underlying swollen crosslinked polymer film residing on a substrate. Scheme 1 depicts the cross-sectional structure of such a bilayer coating. Both the substrate and the coating matrix are assumed to be smooth. The thickness of the lubricant-containing polymer layer to be $h_p$. Since the lubricant is non-volatile and the mixing between it and the polymer matrix is ideal, $$h_s+h_p=h_0 \tag{2}$$

where $h_0$ is a constant. In addition, the $h_s$ and $h_p$ values become $h_{s,0}$ and $h_{p,0}$, respectively, when the lubricant is fully segregated from the polymer film.

It was also assumed that the lateral surface area of the coating is A and the number of lubricant molecules in the polymer layer is $n_s$. In terms of the Lattice model, each repeat unit of the polymer occupies one lattice site and that of a solvent molecule occupies $x_s$ sites. When the polymer is dry, its volume is $V_0$, which is equal to $Ah_{p,0}$, and the crosslinking density n is equal to $v_e/V_0$, where $v_e$ is the number of crosslinks (crosslinking junctions) in the polymer. Additionally, it was assumed that the polymer film could swell or shrink only along the vertical or z direction and did not change its lateral dimensions because it was tethered to the substrate. Lastly, it was assumed that the lubricant/matrix bilayer structure was maintained even when $h_s \rightarrow 0$, which corresponds to a top layer thickness of only a few nanometers. This assumption was made mainly to neglect the energetic changes associated with the loss or creation of surfaces or interfaces.

To formulate $h_s$, an expression for the free energy change $\Delta F_t$ associated with preparing the lubricant-swollen polymer film was recited. Relative to the initial segregated state, the suffusion of a lubricant into a polymer film causes the system's free energy to change due to contributions $\Delta F_m$ and $\Delta F_s$ that correspond to lubricant/polymer mixing and to polymer network stretching, respectively. As will be demonstrated later, $\Delta F_m + \Delta F_s$ is a function of the number of crosslinks $v_e$ in the polymer, the polymer volume fraction $\emptyset_p$ in the swollen layer, the size $x_s$ of the lubricant molecule, the number $n_s$ of lubricant molecules in the polymer, and the Flory-Huggins interaction parameter $\chi$ for the polymer and lubricant. At the coating swelling equilibrium, $\Delta F_m + \Delta F_s$ should be minimal. Taking the partial derivative with respective to $n_s$ and setting this derivative to zero will yield an equation relation $\chi$ to $\emptyset_p$ and plotting the equation gives the binodal curve that defines the equilibrium volume fraction $\emptyset_p$ of the polymer in the swollen polymer layer at a given $\chi$ value. From a given $\emptyset_p$ value, it was possible to calculate the amount of lubricant that was absorbed into the polymer layer and thus deduce the thickness $h_s$ of the residual lubricant layer residing on the surface.

The free energy change accompanying the formation of a polymer solution consisting of $n_s$ solvent molecules of size $x_s$ and $n_p$ polymer chains with a repeat unit number of $x_p$ is given by the well-known Flory-Huggins equation:

$$\frac{\Delta F_s}{kT} = n_s \ln(1 - \Phi_p) + n_p \ln\Phi_p + \chi x_s n_s \Phi_p \tag{3}$$

where kT denotes the thermal energy. In the case of a crosslinked polymer, $n_p=1$.

Classical rubber elasticity theory suggests that the free energy for stretching a piece of rubber containing $v_e$ crosslinks is $$\frac{\Delta F_r}{kT} = \frac{dv_e}{2}(\alpha^2 - 1 - \ln\alpha) \tag{4}$$

where d denotes the number of dimensions in which the rubber can swell. In our model, the coating matrix is assumed to expand only along the vertical direction and thus d is 1. Moreover, we note that $\alpha$, the linear expansion factor, is related to $\emptyset_p$ by eq. (5):

$$\alpha = \frac{1}{\phi_p^{1/d}} \tag{5}$$

Binodal Equation. Combining eqs. (3)-(5) and making use of d=1 and $n_p=1$, we obtain $$\frac{\Delta F_t}{kT} = n_s \ln(1 - \Phi_p) + \ln\Phi_p + \chi x_s n_s \Phi_p + \frac{v_e}{2}\left(\Phi_p^{-2} - 1 + \ln\Phi_p\right) \tag{6}$$

Taking the partial derivative with respect to $n_s$, we have $$\frac{\partial(\Delta F_t/kT)}{\partial n_s} = \ln(1 - \Phi_p) + \Phi_p + x_s \chi \Phi_p^2 + v_s n\left(1/\Phi_p - \Phi_p/2\right) = 0 \tag{7}$$

To obtain eq. (7), we have used:

$$\Phi_p = \frac{V_0}{V_0 + n_s v_s} \tag{8}$$

where $v_s$ is the molecular volume of the lubricant. Rearranging eq. (7) yields the expression relating $\chi_b$ to $\emptyset_p$:

$$\chi = \frac{-1}{x_s \Phi_p^2}\left[\ln(1 - \Phi_p) + \Phi_p + n v_s\left(1/\Phi_p - \Phi_p/2\right)\right] \tag{9}$$

It is noted that eq. (9) has never been derived before despite reports of analogous relations for the 3-D swelling of rubber and the use of eqs. (4) and (5) in explaining thin film swelling data. From eq. (9), an expression for the spinodal curves was derived that provides boundary lines between the metastable and spinodal decomposition regimes.

To obtain the thickness $h_s$ of the surface lubricant layer, we use eq. (10):

$$h_s / h_0 = 1 - (h_{p,0} / h_0) / \Phi_p \tag{10}$$

When $\emptyset_p$ is equal to $h_{p,0}/h_0$, all of the lubricant is absorbed into the polymer matrix. A further decrease in $\emptyset_p$ decomposes a one-layer system into a two-layer system with the top layer consisting of neat lubricant. When $\emptyset_p$ approaches 1, $h_s/h_0$ approaches $h_{s,0}/h_0$, which means that essentially all of the lubricant has been released. Thus $h_s/h_0$ falls between 0 and $h_{s,0}/h_0$.

Plotting $\chi$ vs. $\emptyset_p$ using eq. (9) for a given set of n, $v_s$, and $x_s$ values yields a binodal curve. The $\emptyset_p$ value on such a curve at a given $\chi$ value defines the boundary between a single-layer system consisting of a swollen coating layer and a bilayer system consisting of a lubricant layer that is in equilibrium with an underlying lubricant-swollen polymer layer. Above this $\emptyset_p$ value, a single layer exists. Below this $\emptyset_p$ value, two layers exist with the bottom layer having a polymer volume fraction equal to this $\emptyset_p$ value. Since the region sandwiched by this binodal curve and the y-axis (x axis) passing through $\emptyset_p=0$ corresponds to compositions of samples that decompose into two phases, a $\chi$ vs. $\emptyset_p$ plot containing a binodal curve has also been called a phase diagram for a given set of n, $v_s$, and $x_s$ values.

In generating phase diagrams, parameters are used that closely match their corresponding experimental values. For example, it has been claimed that silicone oil at the molecular weight of 2,000 Da would be a good lubricant because such a sample was not readily lost via evaporation and was reasonably compatible with many polymer matrices. For such a sample, its polymerization degree $x_s$ was calculated be 27. Since the density of silicone oil is close to 1.0 g/mL, its molar volume $v_s$ is 2.0 L/mol. To facilitate lubricant exchange between the polymer and the surface layer, we further assume that the crosslinking density n of the polymer layer is sufficiently low at 1.00 mol/L unless mentioned otherwise. Based on the approximate density of 1.0 kg/L for most polymers and the rough molar mass of 100 g for each repeat unit, this n value corresponds to a molar fractional crosslinking density of ~10%.

FIG. 1 shows some binodal curves that were generated using eq. (9) by assuming $x_s$=27 and the $nv_s$ values of 0, 0.0200, 0.200, 0.50, 1.00, and 2.00, respectively. If $v_s$=2.00 L/mol, these $nv_s$ values correspond to then values of 0, 0.0100, 0.100, 0.250, 0.50, and 1.00 mol/L, respectively.

The binodal curve for $nv_s$=0 is for a system consisting of a lubricant at $x_s$=27 and a linear polymer chain of an infinite molecular weight. The curve suggests the presence of a critical $\chi$ value ($\chi_c$) of 1/54. Below $\chi_c$, a homogeneous solution is formed. Above $\chi_c$, a mixture with $0<\phi_p<1$ may decompose into two phases with one essentially consisting of pure lubricant and the other having a composition $\phi_p$ that is defined by eq. (9).

The above results are consistent with the predictions of classical polymer solution thermodynamic theories. Classical theories predicted, for a system consisting of a solvent of the repeat unit number of $x_s$ and a polymer of the repeat unit number of $x_p$, the following expression for the critical $\chi$ or $\chi_c$ below which a homogeneous solution exists regardless of the $\phi_p$ value:

$$\chi_c = \frac{1}{2}\left(\frac{1}{\sqrt{x_s}} + \frac{1}{\sqrt{x_p}}\right)^2 \quad (11)$$

Inserting $x_s$=27 and $x_p \rightarrow \infty$ into eq. (11), we have $\chi_c$=1/54, a result in agreement with that shown in FIG. 1. Additionally, the $\emptyset_p$ value corresponding to $\chi_c$ is calculated via eq. (12).

$$\phi_{p,c} = \frac{\sqrt{x_s}}{\sqrt{x_s} + \sqrt{x_p}} \quad (12)$$

Since $x_p \rightarrow \infty$, $\emptyset_{p,c} \rightarrow 0$, a result that is again consistent with that seen in FIG. 1.

The introduction of crosslinks drastically changes the binodal curves. First, a critical $\chi_c$ value below which a lubricant is totally infused into the polymer matrix regardless of $\phi_p$ does not exist. Rather, the lubricant becomes completely absorbed by the coating matrix only if it is present in low amounts and $\phi_p$ is high. Second, the $\phi_p$ range over which the lubricant is fully absorbed or a one-layer system exists narrows as $nv_e$ increases. Third, all of the binodal curves gradually merge into a single line regardless of the $nv_s$ value as $\chi$ increases.

The observed trends are reasonable because a crosslinked network cannot swell infinitely due to the elastic restorative force of the network. Moreover, increasing the crosslinking density enhances the restorative force, suppressing network swelling and constricting the solubility $\phi_p$ window as seen in FIG. 1. Finally, the different binodal curves merge at high $\chi$ values because the system enters the $\chi$-dominated regime, where the polymer and lubricant become so incompatible with one another that the lubricant spontaneously segregates from the polymer matrix.

A binodal curve reveals the composition $\emptyset_p$ of a swollen polymer layer in equilibrium with a neat lubricant layer. Knowing the polymer feed volume ratio, which is equal to $h_{p,0}/h_0$, one can then calculate the $h_s/h_0$ value using eq. (10). FIGS. 2A and 2B show how $h_s/h_0$ changes with $\chi$ for a system that has $nv_s$=2.00 and $x_s$=27 and for another system that has $nv_s$=0.74 and $x_s$=10. Notably, $nv_s$ decreased for system 2 because of a decrease in $x_s$ and thus in $v_s$. To construct the curves, it was assumed that the $h_{s,0}/h_s$ values of 15%, 10%, 5%, and 2% or the $h_{p,0}/h_s$ values of 85%, 90%, 95%, and 98%, respectively.

The data shown in FIGS. 2A and 2B exhibit a number of general trends. First, $h_s/h_0$ initially increases with $\chi$ and then plateaus above a certain $\chi$ value. In the case of $x_s$=27, $h_s/h_0$ reaches a plateau at an $\chi$ value of ~0.15. This value changes to ~0.40 for the system with $x_s$=10. Second, the $h_s/h_0$ values in the plateaued region approach their corresponding $h_{s,0}/h_s$ values, suggesting the full release of the lubricant eventually. Third, one can always ensure the presence of a lubricant layer by increasing the $h_{s,0}/h_0$ value in the investigated $\chi$ range of 0 and 0.5. Data was plotted in this $\chi$ range because negative $\chi$ values are special cases involving hydrogen bond formation and electrostatic attractions between the matrix and the lubricant. Fourth, $h_s/h_0$ is reduced under otherwise identical conditions by decreasing $h_{s,0}/h_0$. Fifth, the transition $\chi$ (or temperature) from a lubricant-layer-free single-layer coating to a bilayer coating can be tuned by changing either the $h_{s,0}/h_0$ values or the repeat unit number of the solvent $x_s$.

Referring to FIG. 1, a plot is presented that shows that the shapes of phase diagrams that are drastically changed by varying n at negative $\chi$ values. However, negative $\chi$ values are achieved only when hydrogen bonds or electrostatic attractions are formed between the non-aqueous liquid and the crosslinked polymer matrix among other specific interactions. In general, $\chi$ takes values between 0 and 0.50 for an organic solvent that is miscible with a linear polymer at all compositions. For a non-aqueous liquid that has $x_s$=27, the corresponding $\chi$ range is narrowed to 0 and 1/54. To illustrate the effect of varying n on $h_s/h_0$, plots of $h_s/h_0$ vs $nv_s$ were obtained at different $h_{s,0}/h_0$ values for $\chi$=0.0154 and 0.0456, respectively, which are respectively below and above 1/54.

Referring to FIGS. 2A and 2B, results are shown that shed light on the service lifetime of the layer of non-aqueous liquid. At $\chi$=0.0365 and $x_s$=27, the thickness of the surface lubricant layer at $h_{s,0}/h_0$=15% is 10.5 μm if it is assumed that $h_0$=100 μm. By further assuming that a 2.1-μm thick layer of non-aqueous liquid is lost from each shedding event, it is predicted that the surface layer will survive only 5 accumulation/shed cycles (e.g., icing/de-icing cycles), which is unfortunately insufficient for practical applications. For practical applications, mechanisms other than the simple partition equilibrium (of the non-aqueous liquid in the crosslinked polymer matrix and at the exterior of the coated substrate) are also required to more precisely regulate the thickness of the surface layer and to enable continuous pumping of the non-aqueous liquid to the surface after each shedding loss until it is essentially exhausted.

Referring to FIGS. 2A and 2B, data is presented that not only provides insight on how to regulate the thickness of a surface lubricant layer, but also how to obtain a thermo-responsive anti-icing coating. A thermo-responsive coating that sheds accumulated material stores the non-aqueous liquid within its matrix during the warm seasons to minimize loss from evaporation and rain washing, for example, and only releases it to the surface during winter when it is required. According to FIGS. 2A and 2B, this single-layer to two-layer transition may occur over a $\chi$ range of 0 and ~0.25 in response to changes in either $h_{s,0}/h_0$ or $x_s$. This result is of critical importance because one can readily trigger this desirable transition by adjusting these two parameters rather than going through the arduous task of finding a suitable polymer/matrix combination.

Figure 3B:
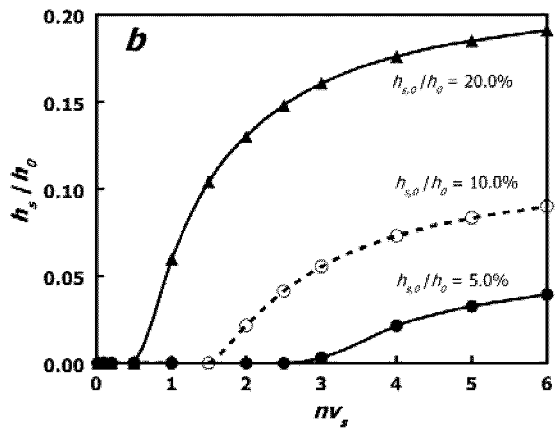
FIG. 3B shows a plot showing the effect of varying $nv_s$ on $h_s/h_0$ at various lubricant feed contents $h_{s,0}/h_0$ and the $\chi$ parameters of 0.0154.

Referring to FIG. 3A, a plot is shown of the effect of varying $nv_s$ on $h_s/h_0$ at various lubricant feed contents $h_{s,0}/h_0$ and the $\chi$ parameters of 0.0456. Referring to FIG. 3B, a plot is shown of the effect of varying $nv_s$ on $h_s/h_0$ at various lubricant feed contents $h_{s,0}/h_0$ and the $\chi$ parameters of 0.0154. These figures show that increasing n or $nv_s$ at a fixed $\chi$ value decreases the amount of non-aqueous liquid that the coating matrix can uptake and the system transitions from a one-layer system to a bilayer system. Moreover, the transition $nv_s$ value can be tuned by adjusting either the $\chi$ or the $h_{s,0}/h_0$ value. Decreasing the $\chi$ or $h_{s,0}/h_0$ value delays the onset $nv_s$ value for this transition.

To cause n to change, one can imagine the use of a coating matrix that is crosslinked with a combination of covalent and hydrogen bonds. As the temperature drops, $\chi$ increases and enables the lubricant to release. Additionally, release of non-aqueous liquid is also promoted due to an increased probability for the formation of hydrogen bonds and thus hydrogen bond-based crosslinks. Data shown in FIGS. 3A and 3B also explains the continuous self-replenishing effect of the exterior non-aqueous liquid layer in equilibrium with a matrix that is crosslinked by hydrogen bonds (Cui, J. X., et al., *Nat. Mater.* 2015, 14 (8), 790-795). At a given temperature, the enthalpy for the formation of hydrogen bond-based crosslinks is constant. However, the entropic penalty against hydrogen bond-based crosslink formation is high in a highly swollen polymer matrix when $h_{s,0}/h_0$ is large. Thus, n is low in this case. As the non-aqueous liquid is lost and $h_{s,0}/h_0$ decreases, the entropic penalty diminishes and n grows, which serves as a continuous pumping force, driving more of the non-aqueous liquid to the surface until a new non-aqueous liquid partition equilibrium is established. Thus, a matrix that is crosslinked with a combination of covalent and hydrogen bonds is an ideal choice for a practical ice-shedding coating. While the covalent crosslinks provide the coating that sheds accumulated material with its mechanical strength, adaptive hydrogen bond-based crosslinks provide a lubricant-concentration-responsive lubricant pumping mechanism.

The effect of varying the degree for polymerization $x_s$ was investigated for the non-aqueous liquid on its release equilibrium by assuming that the molar volume of each repeat unit of the non-aqueous liquid is 0.074 L/mol, the polymer crosslinking density n is 2.00 mol/L, $\chi$=0.0154, and $h_{s,0}/h_0$=10.0%.

Figure 4:
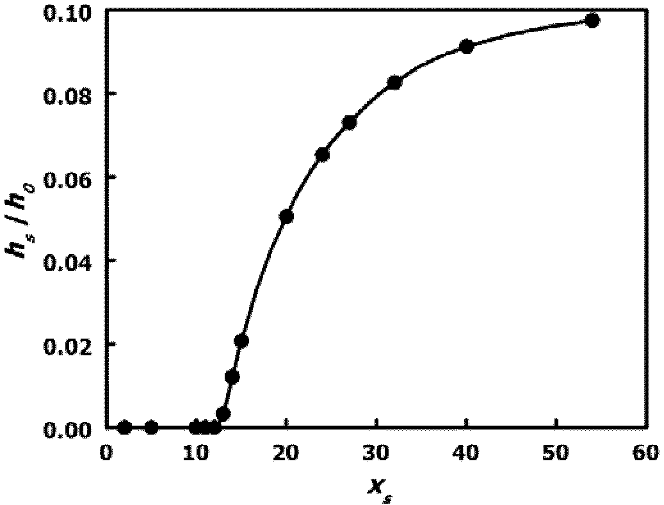
FIG. 4 shows a plot of the effect of varying the number of repeat units $x_s$ of the lubricant on $h_s/h_0$.

Referring to FIG. 4 shows how the equilibrium $h_s/h_0$ value changes with $x_s$. For example, the non-aqueous liquid is fully infused into the coating matrix at $x_s$=12. Increasing $x_s$ by 8.3% to 13 triggers non-aqueous liquid release and the equilibrium $h_s/h_0$ value becomes 0.33%.

Referring to FIGS. 5A and 5B, schematics are shown of a coating as described herein. Notably, in FIG. 5A, squiggly lines are used to represent the non-aqueous liquid. Some of these squiggly lines reside on the surface of the coating, together with a portion of the grafted side chains. Other squiggly lines are shown in the crosslinked copolymer. For the non-aqueous liquid squiggles that are in the crosslinked copolymer, some are depicted as alone (squiggly line only) while others are shown surrounded by side-chains (shown as a ball around the squiggly lines).

To leverage this effect for the construction of a thermo-responsive coating, a non-aqueous liquid was used that is end-functionalized with a weakly associating group. At room temperature, the non-aqueous liquid molecules would exist mostly as monomers and would be readily solubilized in the coating matrix. Decreasing the temperature to ~0° C. would increase the probability for the individual non-aqueous liquid molecules to dimerize, thus causing non-aqueous liquid to be released at low temperatures to facilitate shedding such as ice-shedding.

An ice-shedding coating consisting of a non-aqueous liquid lubricant layer in equilibrium with an underlying crosslinked polymer film has been studied theoretically and experimentally (see Examples and Table 1). Of note have been factors that affect the thickness $h_s$ of the external layer of non-aqueous liquid. For this purpose, the tethered polymer film has been assumed to expand or contract only along the vertical direction. Thus, the Flory-Rehner equation for the 1-D swelling of a rubber by a solvent has been used for the free energy of such a lubricant-swollen film. The free energy was then minimized to find an expression for a binodal curve that defined the polymer volume fraction $Ø_p$ in a swollen film in equilibrium with a neat non-aqueous liquid layer. Aside from being a function of the Flory-Huggins parameter $\chi$, $Ø_p$ was also a function of the polymer crosslinking density n and the number of repeat units $x_s$ of the polymeric non-aqueous liquid. From $Ø_p$ and defined lubricant and polymer feed volume ratios, we calculated and plotted $h_s$ as a function of different variables.

Under otherwise identical conditions, $h_s$ was found to grow with increases in $\chi$, the polymer crosslinking density n, the quantity of used lubricant, and the number of repeat units of the lubricant. While the plots of $h_s$ vs. these variables provide valuable insight for the regulation of $h_s$ for ice-shedding applications, these plots also lead to the important conclusion that the transition from a single lubricant-swollen layer to a bilayer structure can be produced by changing not only $\chi$ but also the amount and the number of repeat units of the polymeric non-aqueous liquid and the crosslinking density of the polymer. These parameters can be readily adjusted, facilitating thermo-responsive ice-shedding coatings that store the non-aqueous liquid within the polymer matrix during the warm seasons to minimize loss but release it during winter when it is needed. Other proposed strategies included the use of a polymer matrix containing a combination of covalent and hydrogen bond-based crosslinks. While the covalent bonds are used to ensure the mechanical strength of the coating under all conditions, the adaptive hydrogen bond-based crosslinks sustain the release of the lubricant after loss from each ice-shedding event until the lubricant is essentially exhausted.

Figures 6, 7:
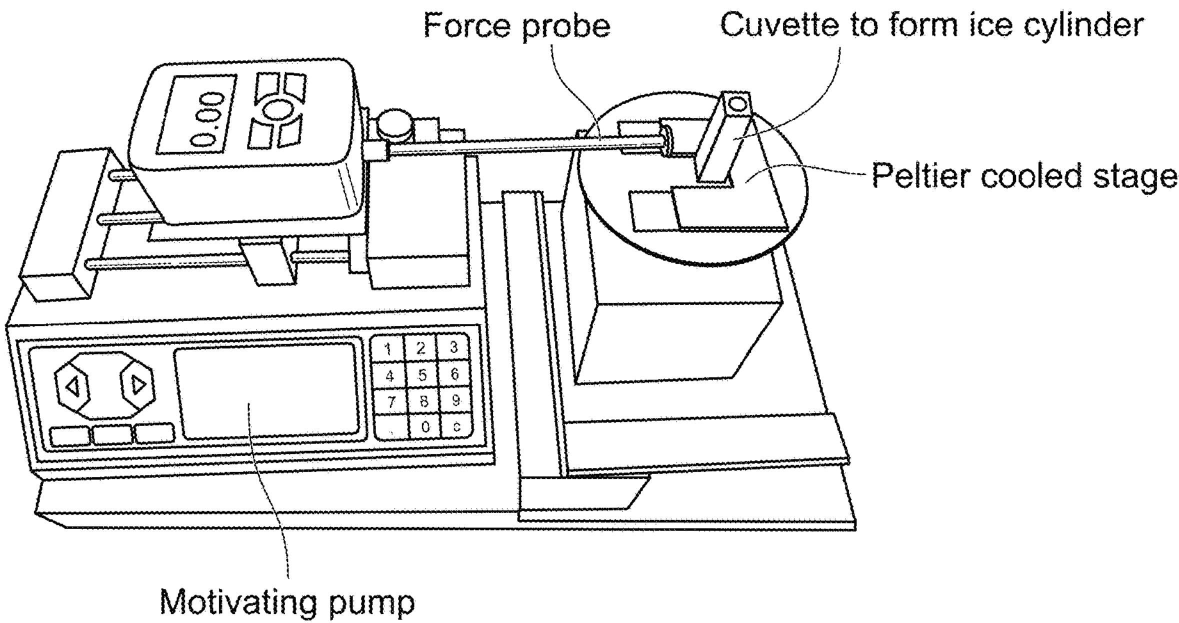
FIG. 6 shows a photograph of an ice adhesion strength test instrument.
FIG. 7 shows a H-bonding motif for two ureidopyrimidinone molecules.

Referring to FIG. 6, a photograph is shown of an ice adhesion strength test instrument, which is discussed in Example 4.

Referring to FIG. 7, a schematic is shown of a H-bonding motif for two ureidopyrimidinone molecules.

Regarding experimental results, Table 1 provides data regarding ice adhesion strengths measured on different coatings. These tests are described in Example 4 and the tabulated results reveals several trends. First, a bilayer coating that features a crosslinked P(EHMA-s-HEMA) matrix and grafted surface PDMS layer was more effective than a crosslinked P(EHMA-s-HEMA) coating at shedding ice (10 times reduction in r value). Second, lubrication of a PDMS layer with silicone oil decreased r value by another 30-40 times. Third, an excess silicone layer on the P(EHMA-s-HEMA) coating surface did not reduce r significantly.

As shown in Table 1, P(EHMA-s-HEMA)-g-PDMS-based PU coating was a good ice-shedding coating.

Although not wishing to be bound by theory, the inventors suggest that this is because its ice-shedding performance is decoupled from its mechanical strength. Traditionally, homogeneous polymer coatings, such as the P(EHMA-s-HEMA)-based coating, are used for ice shedding. For efficient ice shedding, a coating needs to be soft and hydrophobic. However, a soft coating does not have adequate mechanical strength. With the P(EHMA-s-HEMA)-g-PDMS-based PU coating, the ice-shedding job is performed by the swollen grafted PDMS surface layer while sufficient mechanical strength is provided by the matrix layer. The two functions are rendered by two separate layers that are formed in a simple step during coating formation due to the self-assembly or stratification of PDMS chains to the coating surface.

Two ureidopyrimidinone (UPy) molecules can form a dimer associated through four pairs of hydrogen bonds (see FIG. 7). Coatings held together via H bonds of UPy groups can self-heal after damage. It is expected that a coating crosslinked via a combination of H bonds and covalent bonds can not only hold its shape but also self-heal. Such a coating swollen with a lubricant can release more lubricant than a coating that is crosslinked solely with covalent bonds. Example 5 describes the preparation of UPy-NCO.

It is also expected that use of lubricants bearing associating end groups will facilitate lubricant release at low temperatures. Example 9 provides a description of how to prepare and use PDMS-UPy for this purpose.

In one embodiment, a method is provided to fabricate a bilayer coating (see Example 11). In this case, two polyols are used that are similar in composition. They different in two aspects. Polyol 2 contains a small fraction of fluorinated units to facilitate the surface stratification of this polymer. Polyol 2 also differs in that it bears a much lower molar fraction of hydroxyl groups so that it is not as heavily crosslinked as Polyol 1. Polyol 2 stratifies to the surface and forms long loops on the surface due to its light crosslinking. The lightly crosslinked surface layer can uptake lubricant and reduce ice adhesion.

It will be understood by those skilled in the art that this description is made with reference to certain embodiments and that it is possible to make other embodiments employing the principles of the invention which fall within its spirit and scope. The following working examples further illustrate embodiments of the invention and are not intended to be limiting in any respect.

WORKING EXAMPLES

Unless otherwise stated, reaction materials were purchased from Sigma-Aldrich (Oakville, Canada).

Example 1. Synthesis of P(EHMA-s-HEMA)

Polyol P(EHMA-s-HEMA) was prepared by combining distilled 2-ethylhexyl methacrylate (EHMA, 27.8 mL, 24.6 g, 124 mmol), 2-hydroxyethyl methacrylate (HEMA, 5.0 mL, 5.4 g, 41 mmol), and freshly distilled tetrahydrofuran (THF, 260 mL) in a 500-mL round bottom flask. A free radical initiator 2,2-azobis(2-methylpropionitrile) (AIBN, 116 mg, 0.71 mmol) and a chain transfer agent 1-dodecanethiol (82 μL, 0.35 mmol) were added to the flask. After sealing the flask with a rubber septum, $N_2$ was introduced via a syringe needle and used to purge the system for 25 min (another needle was used as the $N_2$ exit). The flask after needle removal containing this reaction mixture was then transferred into an oil bath at 60° C. for 28 h. $^1$H NMR analysis of a small sample showed a double bond conversion of 90%. The reaction mixture was concentrated by rotary evaporation to a volume of concentrate of approximately 50 mL. The concentrate was then added into 400 mL acetonitrile to precipitate the polyol. After supernatant decantation, a precipitate was re-dissolved in 50 mL THF and precipitated into another 400 mL acetonitrile. The final precipitate was dried under vacuum for 2 d to yield 25.3 g P(EHMA-s-HEMA), where s stands for statistical. Size-exclusion chromatography (SEC) analysis gave a polystyrene-equivalent number-average molecular weight $M_n$ value of $2.4\times10^4$ Da and a polydispersity index of 3.16. $^1$H NMR analysis indicated that EHMA and HEMA molar fractions were 67% and 33%, respectively.

Example 2. Synthesis and Purification of P(EHMA-s-HEMA)-g-PDMS

PDMS-bearing polyol P(EHMA-s-HEMA)-g-PDMS was prepared by combining EHMA (22.8 mL, 20.2 g, 102 mmol), HEMA (2.1 mL, 2.3 g, 17 mmol), poly(dimethyl siloxane) bearing one terminal methacrylate group ($PDMS_{10k}$-MA with $M_n$=10 kDa, 4.9 mL, 4.8 g), AIBN (84 mg, 0.51 mmol), and 1-dodecanethiol (60 μL, 0.255 mmol) in freshly distilled THF (240 mL) in a 500-mL round bottom flask at room temperature. The flask was purged with nitrogen gas for 25 min before it was sealed and immersed in an oil bath at 60° C. Heating was continued for 28 h. $^1$H NMR analysis of a small sample taken at this stage yielded a double bond conversion of 83%. Unreacted $PDMS_{10k}$-MA was removed via fractionation, by adding acetonitrile into the reaction mixture until the solution turned cloudy. The reaction mixture was placed into a fridge overnight, resulting in phase separation of the mixture into three layers. SEC analysis of the three layers indicated that the top layer contained no unreacted $PDMS_{10k}$-MA, while the bottom layer contained only $PDMS_{10k}$-MA and the middle layer contained both $PDMS_{10k}$-MA and P(EHMA-s-HEMA)-g-PDMS. After separating the top and bottom layers, the middle layer was diluted with THF to 45 mL. More acetonitrile was added into the diluted middle fraction and the fractionation procedure was repeated to yield different fractions. Each fraction was analysed using SEC to determine if $PDMS_{10k}$-MA was detected. In the end, fractions that contained no unreacted $PDMS_{10k}$-MA were combined, rotary evaporated, and dried under vacuum to yield 19.9 g of crude P(EHMA-s-HEMA)-g-PDMS, where g stands for graft.

Crude P(EHMA-s-HEMA)-g-PDMS was re-dissolved into 40 mL of THF and added into 400 mL of acetonitrile to precipitate the polymer. After centrifugation, unreacted EHMA and HEMA were removed together with the resultant supernatant. The resultant precipitate was re-dissolved into 40 mL of THF and re-precipitated into 400 mL of acetonitrile. The twice precipitated polymer was collected and dried under vacuum for 2 d to yield 14.5 g P(EHMA-s-HEMA)-g-PDMS.

While the P(EHMA-s-HEMA)-g-PDMS sample mentioned above could have been used directly for coating preparation, instead further fractionation of the sample was completed to obtain samples with different molecular weights and compositions. These samples provided an opportunity to investigate how varying these parameters would affect the quality of the coating. For this study, 13.0 g of the dried P(EHMA-s-HEMA)-g-PDMS sample was dissolved into 100 mL of THF, and 145 mL acetonitrile was added to yield a cloudy mixture. The cloudy mixture was then placed in a fridge overnight and yielded two layers. The bottom layer was rotary evaporated to remove solvent yielding a solid. The solid was further dried under a mechanical vacuum pump to yield 11.1 g P(EHMA-s-HEMA)-g-PDMS. SEC characterization revealed that this polymer had a polystyrene-equivalent $M_n$ value of $3.8\times10^4$ Da and a polydispersity index of 1.60. $^1$H NMR analysis indicated that the EHMA, HEMA, and $PDMS_{10k}$ molar fractions were 76.8%, 22.6%, and 0.67%, respectively, which corresponded to a PDMS mass fraction of 27%.

Example 3A. P(EHMA-s-HEMA)-Based and P(EHMA-s-HEMA)-g-PDMS-Based Polyurethane Coatings To prepare a polyurethane (PU) coating, P(EHMA-s-HEMA) or P(EHMA-s-HEMA)-g-PDMS (300 mg) was dissolved in 1.00 mL of THF. To this solution was then added a hexamethylenediisocyanate trimer (HDIT, a triisocyanate) at an isocyanate-to-total hydroxyl group molar ratio of 1.20:1.00. The resultant mixture was pushed through a 0.45 μm filter to remove dust and 0.40 mL of the filtrate was drop-cast onto a 1.0"×1.0" glass slide. Each of the obtained slides was then dried in an oven under gentle nitrogen flow at room temperature for 1 h before the resultant films were cured overnight at 120° C. Approximate density of the resultant P(EHMA-s-HEMA) and P(EHMA-s-HEMA)-g-PDMS PU coatings was 1.0 g/cm$^3$, and the thicknesses of the coatings were calculated to be ~200 μm and ~180 μm, respectively.

Example 3B. Preparation of Silicone-Flooded Coatings and Silicone-Infused Coatings To dose the coatings of Example 3A with a silicone oil that has a kinematic viscosity of 5 cSt and $M_n$=770 Da, the coating samples were soaked in the oil for 24 h. After the samples were then taken out from silicone oil, the excess silicone oil was not removed to yield silicone-flooded coating samples. Removing excess silicone oil via wiping with Kimwipe® tissue gave rise to silicone-infused coatings.

Example 4. Ice Formation and Adhesion Tests

Plastic cuvettes for spectrophotometric analysis with inner dimensions of 10×10×43 mm$^3$ and a hole drilled at its bottom end were used as molds for ice columns. To prepare ice of a fixed cross-sectional area of 100 mm$^2$, a coating sample was levelled in a −20° C. freezer before a cuvette was put upside down on the coating. This was followed by the addition 2.0 mL of deionized water into the cuvette from the drilled hole. At least 6 h was allowed for ice formation.

Ice adhesion strength τ was measured using a homebuilt instrument shown in FIG. 6. It consisted of a sample stage cooled by a Peltier device (right) and a force probe that is moved with a syringe pump (left). Before sample analysis, the sample stage was pre-cooled for at least 15 min to −16° C. After a sample taken out from the freezer was mounted on the cooling stage as fast as possible, the pump was immediately engaged to push the force probe towards the ice column at a rate of 0.20 mm/s. At this force probe advancing speed, it took normally shorter than 1 min for the recorded force to reach its maximum reading and for the ice to move. The τ value was calculated using a ratio of this force to the ice contact area of 100 mm$^2$. Five specimens were tested to obtain the average τ for each coating sample. Table 1 lists τ values determined for the coatings, which are cured dry PU coatings of P(EHMA-s-HEMA) and P(EHMA-s-HEMA)-g-PDMS (see Example 3A) as well as these coatings that were flooded and infused with the silicone oil (see Example 3B).

Example 5. Synthesis of UPy-NCO

Synthesis of ureidopyrimidinone bearing a reactive isocyanate group, UPy-NCO, has been previously reported (see Liu, M. J. et al., *Angew. Chem. Int. Ed.* 2018, 57 (35), 11242-46, and Folmer, B. J. B. et al., *Adv. Mater.* 2000, 12 (12), 874-78). UPy-NCO is prepared using the following protocol. Hexyldiisocyanate (0.70 mol) and 2-amino-4-hydroxy-6-methylpyrimidine (0.12 mol) is refluxed for 10 h in toluene under nitrogen. After cooling, pentane is added to precipitate the product and the precipitate is filtered and washed with pentane. While the cleaned product is vacuum-dried, the filtrate organic phase is rotary evaporated to remove solvent and recover excess hexyldiisocyanate.

Example 6. Preparation of a PU Coating Crosslinked with Covalent and H Bonds A polyol consisting of methyl methacrylate (MMA), butyl methacrylate (BMA), HEMA, and $PDMS_{10k}$-MA is prepared at molar ratios of 80/80/40/1. Free radical and chain transfer agent concentrations are adjusted so that the final molecular weight of the resultant graft copolymer, P($MMA_{39.8\%}$-s-$BMA_{39.8\%}$-s-$HEMA_{19.9\%}$)-g-PDMS, has a number-average molecular weight of ~35 kDa. The polymer is dissolved in a solvent such as butanone or ethyl acetate at a concentration of 300 mg/mL. To this solution is then added a mixture of HDIT and UPy-NCO. The molar ratio between isocyanate groups and hydroxyl groups is 1.2/1.0 wherein the isocyanate groups include those of HDIT and UPy-NCO. The molar ratio between HDIT and UPy-NCO is changed so that the molar ratios of the isocyanate groups of HDIT and UPy-NCO are 1/0, 0.5/0.5, 0.25/0.75, and 0/1 and the resultant coatings are denoted as PU-H0, PU-H50, PU-H75, and PU-H100, respectively. That is, mixtures of HDIT and UPy-NCO are referred to as PU-H0, PU-H50, PU-H75, and PU-H100 wherein 0, 50, 75, and 100 are an amount on the percentile scale of isocyanate groups contributed by UPy-NCO. The casted coatings, after solvent evaporation, are cured by heating at 150° C. for 3 h.

Example 7. Extents of Silicone Oil Release from the Different Silicone-Saturated Coatings To load a silicone oil into PU-H0, PU-H50, PU-H75, and PU-H100 coating samples, the samples are equilibrated at 50° C. with silicone oil for 24 h, 48, and 72 h. Upon removing the samples out of silicone oil, surfaces are cleaned with Kimwipe® tissue and their weights are measured. From this kinetic experiment, critical time required to saturate the coating matrices with the lubricant is established and maximal amounts of lubricant sorbed by the different coatings are determined.

For lubricant release studies, first weigh the coating sample and then load silicon oil into the coating samples using the established critical time or a longer oil/coating equilibrium time. Then clean oil on the coating surfaces using Kimwipe® tissue and weigh the lubricant-saturated coating sample. The removal of silicone oil from the coating surfaces triggers release of silicone oil from the coating matrix until a new lubricant partition equilibrium is established. Clean the released silicone oil again with Kimwipe® tissue and weigh the resultant sample. This experiment involving surface oil removal/waiting/sample weighing will be repeated for each sample until no further oil weight loss can be detected or no further silicone oil release is possible. Maximal fractions of released silicone oil of different samples are correlated with the H-bond percentages in the coating samples.

Example 8. Sustained Ice-Shedding Performance of a Coating Containing H-Bond Crosslinks The maximal amount of lubricant that can be sorbed by a PU-H75 coating will be determined using the protocol reported in Example 10. In this example, instead of soaking the coating samples in silicone oil, the oil is loaded in a different way. On the surface of a freshly-prepared PU-H75 coating sample is dispensed 1.5 times the volume of lubricant that can be sorbed by the coating sample. After heating the coating and the lubricant at 50° C. in a close container overnight to establish the lubricant partition equilibrium, a lubricant-flooded coating sample is obtained. An ice column is prepared on this coating and the formed ice will be removed to determine the ice adhesion strength. The coating sample after ice removal is subjected to another icing/ice removal (icing/de-icing) cycle. The cycle is repeated and the ice adhesion strength is measured during each cycle. The r value is plotted as a function of the cycle number to show that the coating can maintain its ice-shedding properties for many cycles. Similar data are obtained on PU-H0 specimens. The two sets of data will be compared to show that the PU-H75 coating survives more icing/de-icing cycles than the PU-H0 coating without significantly compromising its $\tau$ value.

Example 9. Synthesis of PDMS-UPy $PDMS_{1k}$-$NH_2$, which denotes a PDMS having a molecular weight of 1 kDa and bearing a terminal amino group, is reacted under $N_2$ with 0.90 molar equivalent of UPy-NCO in butanone or chloroform (chloroform dissolves UPy-NCO better than butanone) at 60° C. for 5 h. To minimize interference of water from solvent, a minimal amount of solvent will be used. $PDMS_{1k}$-UPy is produced, which is expected to form dimers or even multiple clusters in butanone. To remove un-reacted $PDMS_{1k}$-$NH_2$, a fractional precipitation is performed involving adding acetonitrile into the butanone solution. Dimer or multiplex phase-separates from the solution before unreacted $PDMS_{1k}$-$NH_2$.

An alternative protocol will involve the use of more UPy-NCO than $PDMS_{1k}$-$NH_2$. In this case, excess unreacted UPy-NCO is removed as the impurity. UPy-NCO is expected to form strong H bonds with the terminal UPy units of PDMS chains. The H bonds are broken via the addition of a small amount trifluoroacetic acid. Methanol is added to trigger phase separation of $PDMS_{1k}$-UPy, which is collected and pumped under vacuum to remove solvent and trifluoroacetic acid.

Example 10. $PDMS_{1k}$-UPy as Lubricant

A PU-H75 coating is prepared. To the surface of the coating is dispensed more $PDMS_{1k}$-UPy than can be uptaken by the coating matrix. The two are heated overnight to infuse $PDMS_{1k}$-UPy into the coating matrix. In a control experiment, a silicone oil sample of the molecular weight of 1 kDa is infused into a separate sample of the coating matrix. The anti-icing properties of the two types of coatings are compared.

In another embodiment, $PDMS_{1k}$-UPy is mixed with HDIT and UPy-NCO, P($MMA_{39.8\%}$-s-$BMA_{39.8\%}$-s-$HEMA_{19.9\%}$)-g-PDMS and then cast to yield, after solvent evaporation, a coating film. The film is then thermally cured to yield a PU-H75 coating bearing $PDMS_{1k}$-UPy as a lubricant. Ice shedding performance of coatings containing different amounts of $PDMS_{1k}$-UPy are determined and compared. The longevity of such coatings after many icing and de-icing (ice removing) cycles is investigated. With a coating matrix that bears UPy and the silicone oil bearing UPy, it is expected that this lubricant will have longer retention time than its counterpart without a terminal UPy group.

Example 11. Method for Bilayer Coating Preparation

One embodiment is a method for co-curing of two polyols with HDIT to yield a bilayer PU coating. The two polyols are P($EHMA_{80\%}$-s-$HEMA_{20\%}$) and P($EHMA_{93\%}$-s-$HEMA_{3\%}$-s-$FHEMA_{4\%}$), where FHEMA denotes 2-(perfluorohexyl) ethyl methacrylate) and the subscripts denote the molar fractions of the individual monomers in the copolymers. The copolymers are prepared via free radical copolymerization. FHEMA is incorporated into the second polyol, P($EHMA_{93\%}$-s-$HEMA_{3\%}$-s-$FHEMA_{4\%}$, to facilitate its surface stratification. Further, the molar fraction of HEMA is much reduced so that this polyol will not be heavily crosslinked. Rather, some of it will exist on the surface of a coating as long loops, which will help trap oil for ice shedding. The two polyols are similar in composition so that they are sufficiently compatible and do not undergo macrophase separation from each other in the coating matrix.

The two polyols at a mass ratio between 5/1 and 50/1 are mixed with HDIT at a molar ratio of 1:00/1:20 between the hydroxyl and isocyanate groups. After solvent evaporation, the coating is cured, for example, by heating at 150° C. for 1 h.

TABLE 1

Ice Adhesion Strengths in kPa Measured on Five Different Coatings and on Bare Glass Plates

| Coating Sample | Specimen 1 | Specimen 2 | Specimen 3 | Specimen 4 | Specimen 5 | Average |
|---|---|---|---|---|---|---|
| P(EHMA-s-HEMA) | 477 | 400 | 414 | 532 | 497 | 464 ± 57 |
| P(EHMA-s-HEMA)-g-PDMS | 19 | 71 | 6.5 | 63 | 51 | 42 ± 28 |
| Flooded P(EHMA-s-HEMA) | 462 | 430 | 333 | 292 | 313 | 366 ± 75 |
| Flooded P(EHMA-s-HEMA)-g-PDMS | 2.0 | 1.0 | 1.5 | 1.0 | 0.5 | 1.2 ± 0.6 |

TABLE 1-continued

Ice Adhesion Strengths in kPa Measured on Five Different Coatings and on Bare Glass Plates

| Coating Sample | Specimen 1 | Specimen 2 | Specimen 3 | Specimen 4 | Specimen 5 | Average |
|---|---|---|---|---|---|---|
| Infused P(EHMA-s-HEMA)-g-PDMS * | 1.0 | 2.5 | 1.0 | 1.5 | 0.5 | 1.3 ± 0.8 |

* Please note that this set of values were measured using the force probe advancing speed of 1.1 mm/s. All other data were obtained at the force probe advancing speed of 0.20 mm/s.

We claim:

1. A method for shedding accumulated material, comprising:

applying a coating precursor to a substrate to form a crosslinked coating, wherein the coating precursor comprises a crosslinkable copolymer comprising hydrogen bonding moieties and liquid-like side chains that are compatible (miscible) with a selected non-aqueous liquid, wherein the selected non-aqueous liquid is ethylene glycol and the liquid-like side chains are poly(ethylene glycol); and adding 0.2-30 vol % of the selected non-aqueous liquid either to the coating precursor or to the crosslinked coating, wherein accumulated material on the coating sheds.

2. The method of claim 1, wherein the crosslinkable copolymer comprises polyurethane, epoxy, polymethacrylate, polymer/inorganic hybrid coating, rubber, or polyacrylate.

3. The method of claim 1, wherein the hydrogen bonding moieties comprise acrylamide, urea, urethane, ureidopyridinone, hydroxyl, carboxyl, amino, pyridine, nucleic bases, or any combination thereof.

4. The method of claim 1, wherein the selected non-aqueous liquid is ethylene glycol, glycerol, ionic liquid, oligo (ethylene glycol), or oil.

5. The method of claim 4, wherein the oil comprises cooking oil, canola oil, vegetable oil, poly(dialkyl siloxane), perfluorinated polyether, poly(alkyl acrylates), polyisobutylene, any polymer that is a liquid down to −40° C., poly (diphenyl siloxane), poly(methylphenyl siloxane), polyisobutylene, poly(alkyl methacrylate), poly(alkyl acrylate), poly(alkyl styrene), perfluorinated polyether, poly(diethyl siloxane), hexadecane, sunflower oil, canola oil, cotton seed oil, or a combination thereof.

6. The method of claim 1, wherein the liquid-like side chains and the non-aqueous liquid are the same.

7. The method of claim 1, wherein the liquid-like side chains and the non-aqueous liquid are different.

8. The method of claim 1, wherein accumulated material comprises ice, marine organisms, bacteria, blood, biofluids, proteins, smudges, stains, or a combination thereof.

9. The method of claim 1, wherein the coating precursor further comprises a crosslinker.

10. The method of claim 1, the coating precursor further comprises P(EHMA-s-HEMA), P(EHMA-s-HEMA)-g-PDMS, P(EHMA-s-HEMA)-based polyurethane, P(EHMA-s-HEMA)-g-PDMS-based polyurethane, P(EHMA-s-MMA-s-HEMA), P(EHMA-s-MMA-s-HEMA)-based polyurethane, P(EHMA-s-MMA-s-HEMA)-g-PDMS, P(EHMA-s-MMA-s-HEMA)-g-PDMS-based polyurethane, or any combination thereof, wherein EHMA is 2-ethylhexyl methacrylate; HEMA is 2-hydroxyethyl methacrylate; and PDMS is poly(dimethyl siloxane).

11. The method of claim 1, wherein the crosslinked coating comprises a lubricated bilayer coating.

12. The method of claim 11, wherein the crosslinked coating comprises a copolymer that comprises a first and a second polyol, wherein the second polyol comprises a small fraction of fluorinated moieties and comprises a lower molar fraction of hydroxyl groups than the first polyol.

13. The method of claim 12, wherein the first polyol is P(EHMA80%-s-HEMA20%) and the second polyol is P(EHMA93%-s-HEMA3%-s-FHEMA4%), where EHMA denotes EHMA is 2-ethylhexyl methacrylate; HEMA denotes 2-hydroxyethyl methacrylate; FHEMA denotes 2-(perfluorohexyl) ethyl methacrylate), and subscripts denote molar fractions of monomers in the copolymer.

14. The method of claim 11, wherein the crosslinked coating comprises P(EHMA-s-HEMA)-g-PDMS, wherein EHMA is 2-ethylhexyl methacrylate; HEMA is 2-hydroxyethyl methacrylate; and PDMS is poly(dimethyl siloxane).

15. The method of claim 11, wherein the lubricated bilayer coating comprises PDMS-UPy, wherein PDMS is poly(dimethyl siloxane); and UPy is ureidopyrimidinone.

16. The method of claim 11, wherein the lubricated bilayer coating comprises a mixture of HDIT and UPy-NCO referred to as PU-H0, PU-H50, PU-H75, and PU-H100 wherein 0, 50, 75, and 100 are an amount on the percentile scale of isocyanate groups contributed by UPy-NCO.

* * * * *